July 27, 1948.　　　　T. R. SMITH　　　　2,446,064
SPRING CLUTCH DRIVE
Filed July 12, 1946　　　　　　　　　　　3 Sheets-Sheet 1
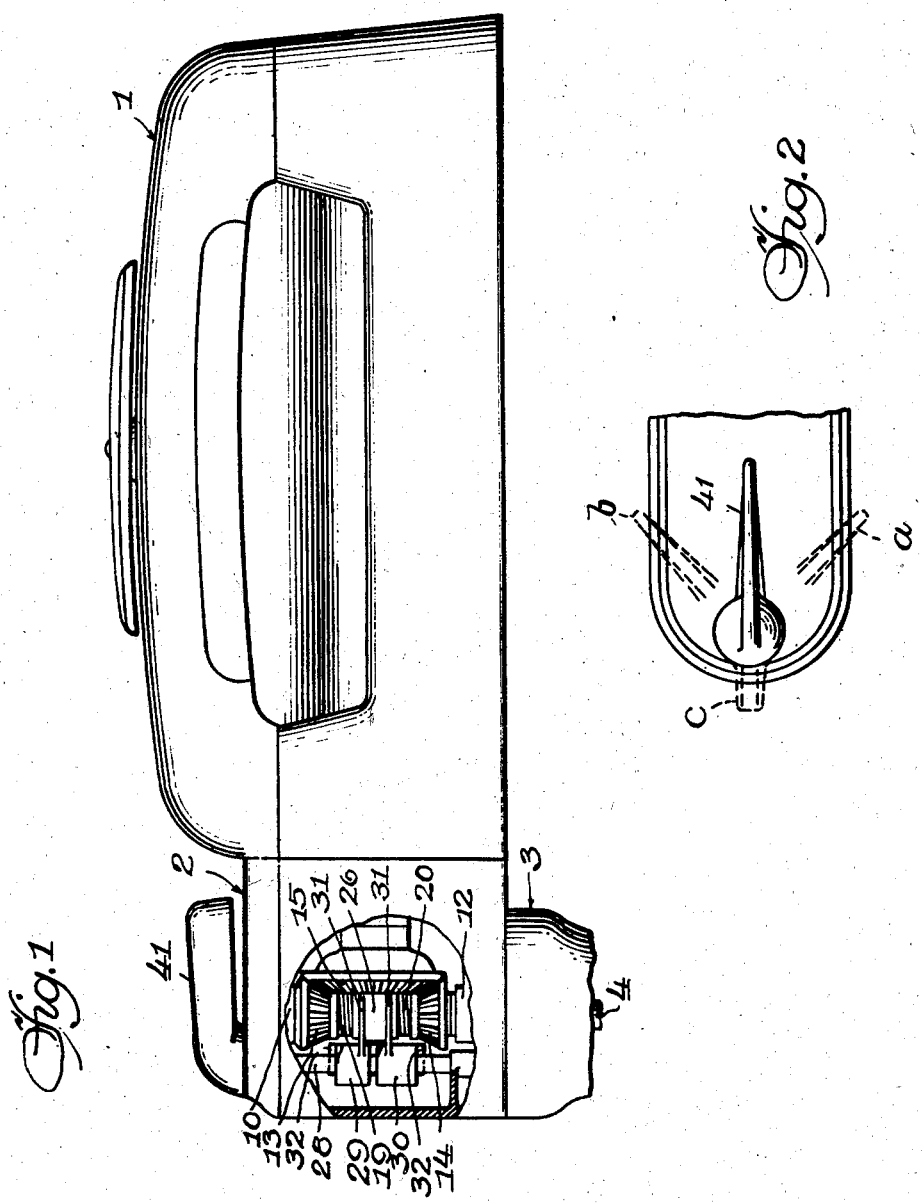
INVENTOR.
Thomas R. Smith,
BY
　　Carl F. Treffert
　　　　Atty.

July 27, 1948. T. R. SMITH 2,446,064
SPRING CLUTCH DRIVE
Filed July 12, 1946 3 Sheets-Sheet 2

INVENTOR.
Thomas R. Smith
BY
Carl F. Feppert
Atty.

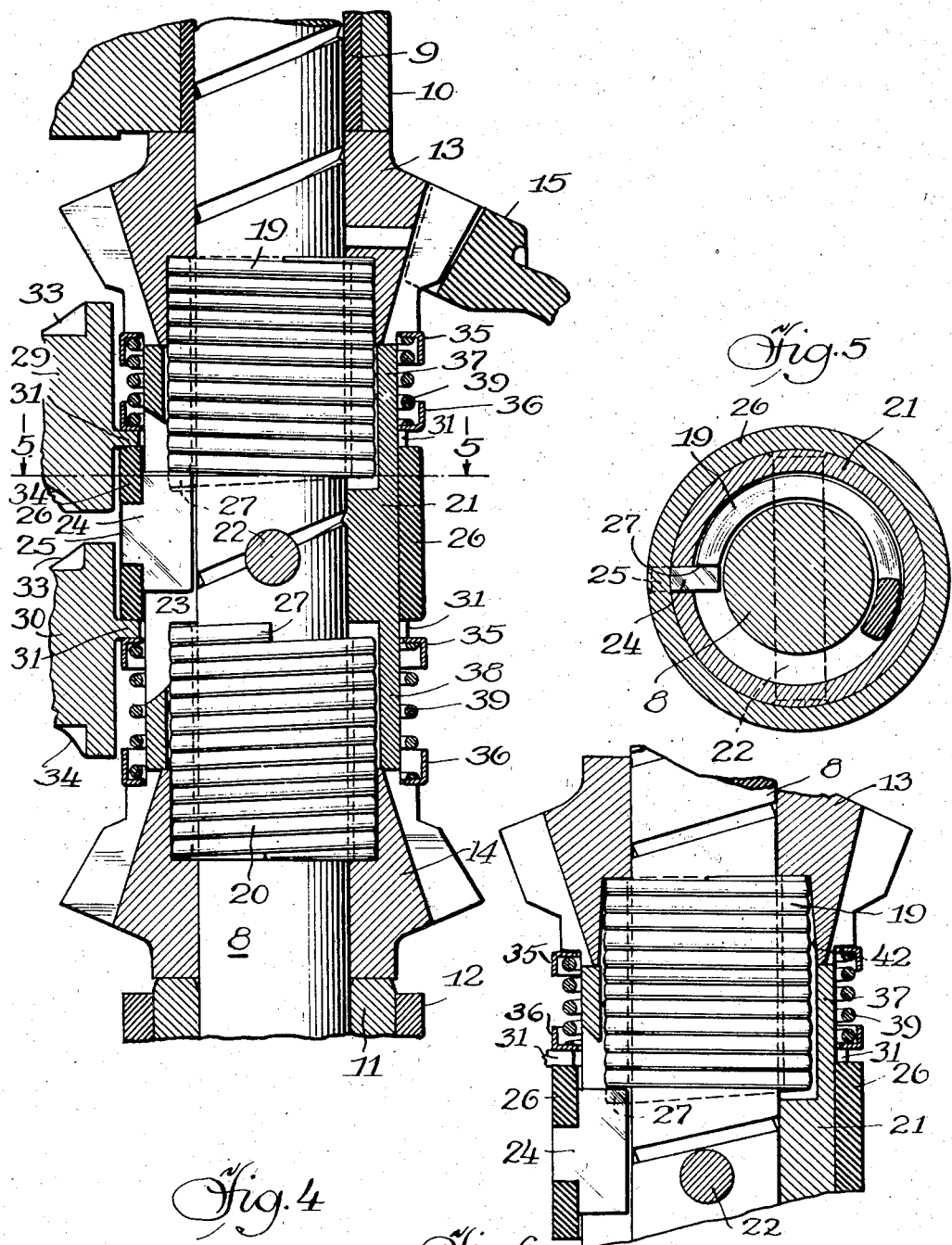

Patented July 27, 1948

2,446,064

UNITED STATES PATENT OFFICE 2,446,064

SPRING CLUTCH DRIVE

Thomas R. Smith, Newton, Iowa, assignor to The Maytag Company, Newton, Iowa, a corporation of Delaware Application July 12, 1946, Serial No. 683,189

2 Claims. (Cl. 192—51)

1

The present invention relates to a spring clutch drive and particularly to a novel reversing clutch construction for power drives.

Among the objects of the present invention is the provision of a novel spring clutch drive associated with the drive shaft and adapted to be expanded into engagement with an internal clutch surface on an encompassing drive sleeve.

A further object of this invention is the provision of a novel drive or clutch spring that is totally unsupported on its inner diameter and adapted to be expanded into clutching engagement with a drive member encompassing one end of the clutch spring.

The invention further comprehends a novel spring clutch drive of the expanding pick-up type associated with a drive shaft and including a clutch spring unsupported on its inside diameter, a drive sleeve encompassing an end of the clutch spring with running clearance therebetween, a driven member encompassing under spring tension the other end of the clutch spring, and a driving or pick-up lug so constructed and arranged as to engage one end of the clutch spring and expand it into driven contact with the drive sleeve.

Another important advantage of the present clutch or drive spring is that the thickness of the wire need be held no closer than the ordinary wound tolerances, and it is unnecessary to finish the inside diameter for the reason that the spring is totally unsupported thereat. Furthermore, in order to finish the outside diameter all that is necessary is to put it through a centerless grinder. That is a simple and inexpensive operation and greatly reduces the cost of such springs.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in side elevation of a wringer assembly equipped with the novel spring clutch drive and with a part of the wringer head or gear

2 casing broken away to shown the spring clutch drive and the manner of reversing the drive to the driven member.

Fig. 2 is a top plan view of the wringer head or gear casing showing the single control handle in its neutral position, and in dotted outline the positions for clutching and rotating the driven shaft and wringer rolls in either direction.

Fig. 4 is an enlarged view in vertical cross-section of the gear casing with the free end of the upper clutch spring engaged and about to be expanded into clutching relation.

Fig. 5 is a view in horizontal cross-section taken in a plane represented by the line 5—5 of Fig. 4.

Fig. 6 is a fragmentary view of the upper clutch spring and its associated parts, but showing the driven member provided with a tapered recess or counterbore for receiving and frictionally retaining an end of the spring.

Figure 3:
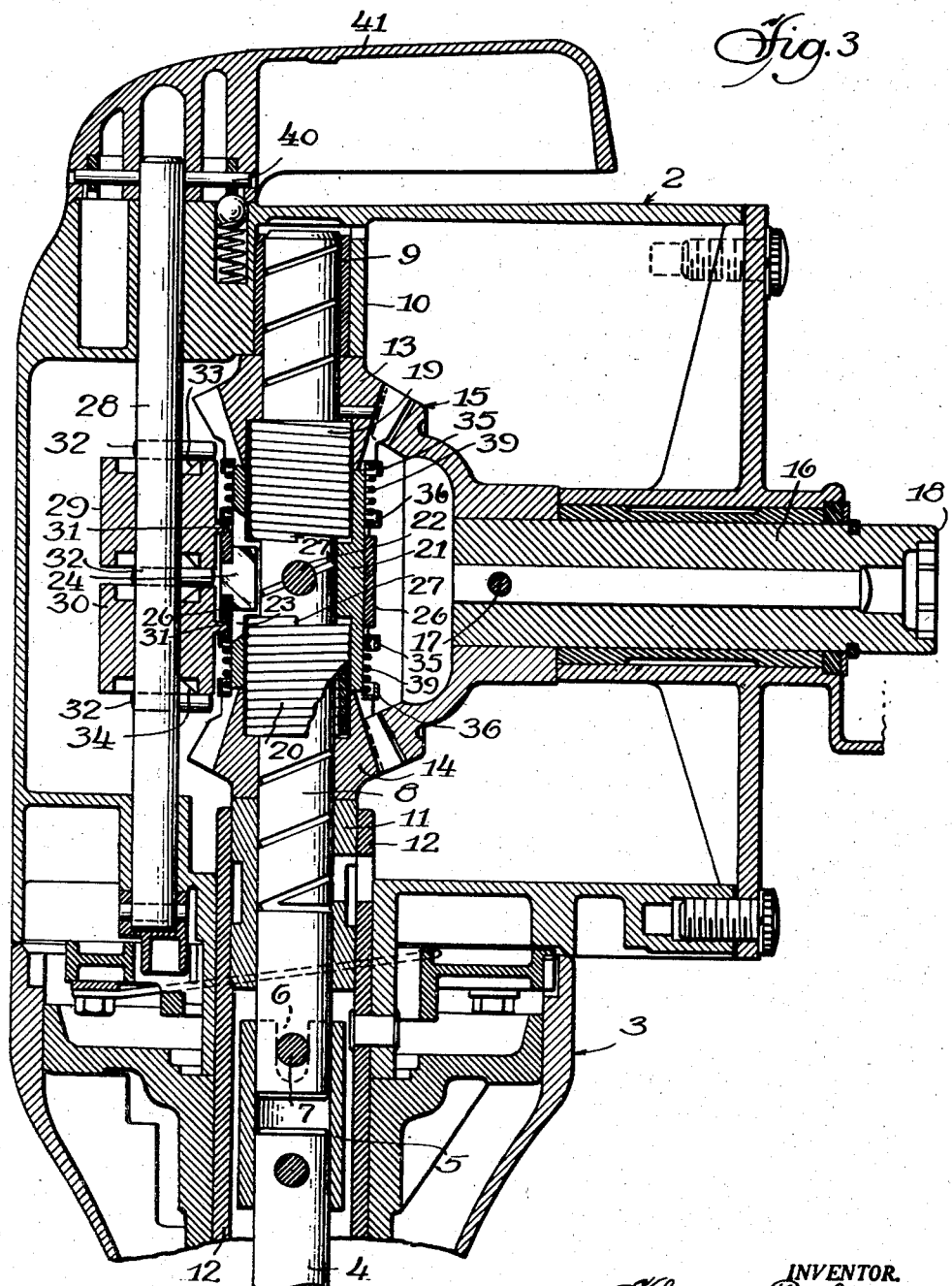
Fig. 3 is a fragmentary enlarged view in vertical cross-section taken longitudinally through the wringer head or gear casing and its reversing drive mechanism.

Referring more particularly to the disclosure in the drawings and the novel illustrative embodiment therein shown the spring clutch drive is shown as applied to a wringer head construction for reversing the direction of rotation of the driven and wringer rolls. The wringer 1 is shown attached to a wringer head or gear case 2 rotatably mounted upon a wringer post or support 3 of a washing machine. In order that the operator may wring the garments from various positions into a plurality of tubs or containers, the wringer is preferably adapted to swing in a complete circumference and to be locked in a plurality of such positions, and the wringer and wringer head assembly is adapted to be readily lifted from and removed from the post or support 3 should the occasion require. To permit such removal the wringer drive shaft 4 is provided at its upper end with a drive collar 5 keyed or pinned to the upper end of the vertical drive shaft, and with this collar notched at 6 to receive projecting pins 7 on the lower end of an aligned drive shaft 8 carried and journalled in the wringer head or gear casing 2.

The drive shaft 8 is shown as journalled at its upper end in a bearing 9 pressed into a boss 10 in the wringer head or gear case 2, and at its lower end is journalled in a bushing 11 pressed into an upstanding tube 12 for the wringer stem. Opposed pinions or bevel gears 13 and 14 are mounted and each is freely rotatable upon the shaft 8 adjacent the respective bearings or bushings 9 and 11. These pinions or bevel gears are in continuous mesh with and adapted to drive a large bevel gear or pinion 15 pinned to a drive shaft 16 by means of a groove pin or key 17, the shaft 16 being formed at its outer end 18 for coupling to a roll shaft for rotating the wringer rolls in either direction but under the control of the operator.

The present invention comprehends a novel spring clutch drive of the expanding pick-up type and includes an upper or left-hand clutch spring 19 having its upper end forced into a counterbore in the end of the pinion 13, the counterbore being somewhat smaller than the free outside diameter of the spring whereby the spring drives by friction maintained by the spring pressure alone. This coefficient of friction and the number of coils of the drive spring 19 that are received within the counterbore is such that no slipping can occur between the spring and the pinion under the operating loads to which it is subjected in use. A lower or right-hand clutch or drive spring 20 is similarly mounted in the counterbore in the end of the pinion or bevel gear 14.

The engaging end of each of the drive springs 19 and 20 is normally in its free or declutched position and is maintained in that position with a free running clearance between the adjacent surface of the driving shaft 8 and the opposite ends of an encompassing drive collar or sleeve 21. This drive collar is secured or keyed to the drive shaft 8 by means of a drive pin 22 and is longitudinally slotted at 23 to receive and carry therewith a pick-up or drive lug 24 slidable longitudinally of the shaft. This pick-up or drive lug 24 is provided with a reduced end or projection 25 conformably received in a longitudinally extending slot or notch in a shifter sleeve 26 encompassing the central part of the drive collar and slidable thereon to move the lug into engagement with the end 27 of either spring 19 or 20, whereby when the drive lug engages the end of either spring it expands that spring into clutching engagement with the inside diameter of its respective end of the drive collar or sleeve 21. As the drive shaft 8 is continuously rotated and carries therewith the drive collar 21, pick-up lug 24 and shifter sleeve 26, such rotation of the shaft 8 is imparted through these members to either spring 19 or 20, and from the latter to its respective pinion 13 or 14, and as these latter pinions are in continuous mesh with the driven pinion or bevel gear 15 the shaft 16 is rotated in the desired direction for operating the wringer rolls.

In order to move the shifter sleeve 26 and pick-up or drive lug 24 into engagement with the end 27 of either spring 19 or 20, there is provided a manually operated shifter shaft 28 carrying a pair of spaced cams 29 and 30, each provided with bifurcations or projections 31 seating against the opposite ends of the shifter sleeve 26 and adapted to move this sleeve up and down upon the drive collar 21 and drive shaft 8. Such movement is accomplished by means of spaced pins 32 secured to or carried upon the shifter shaft 28 and engaging the cam faces 33 and 34 on the opposite ends of the spaced cams 29 and 30. These cam faces are so contoured that as the shifter shaft carrying the pins 32 is rotated through a predetermined angle from its neutral position, the cams and the projections or bifurcations 31 are raised and lowered, and in such movement raise and lower the shifter sleeve 26 and the pick-up lug 24 sufficiently to cause the latter to engage an end 27 of the upper or lower drive spring to thereby unwind or expand the engaged spring into clutching engagement with an end of the drive sleeve 21. In order that these cams 29 and 30 are responsive to the movement of the shifter shaft 28, a pair of separate and opposed angularly-shaped collars 35 and 36 encompass the opposite ends 37 and 38 of the drive sleeve 21 and receive the opposite ends of a coil spring 39 which tensionally maintains the inner collars 35 in engagement with a face of the bifurcations or projections 31, the other face of these bifurcations or projections seating against the ends of the shifter sleeve 26.

The shifter shaft is secured at its upper end by a pin 40 to a control handle 41 shown more clearly in Figs. 1, 2 and 3. As shown in Fig. 2, the control handle is in neutral position but may be readily moved to either of the dotted line positions a or b in which the cams 29 and 30 are moved to cause clutching engagement with one or the other of the drive springs 19 or 20.

The cam faces 33 and 34 are so contoured that when the shifter shaft is rotated by the control handle 41 through an angle of approximately 45° in a clockwise direction to the dotted line position a of Fig. 2, the upper cam 29 is raised by the intermediate pin 32 engaging the swell on the lower face 34 of this cam, with the uppermost pin 32 seating at the same time in a depression or dwell on the upper face 33. Raising of this cam carries along its projections or bifurcations 31 which in turn raise the collar 35 on the end 37 of the drive sleeve 21 and compresses its coil spring 39. At the same time, the intermediate pin 32 is positioned directly above the dwell on the upper face 33 of the lower cam 30 permitting the lower coil springs 31 encompassing the lower end 38 of the drive sleeve 21 to expand and by engaging the projections or bifurcations 31 on the cam 30 to raise this cam and the shifter sleeve upwardly and away from the lower clutch spring 20. As the raising of the lower cam 30 in turn raises the shifter sleeve 26 until the pick-up or drive lug 24 engages the end 27 of the drive spring 19, this spring is caused to unwind or expand until it clutches the inside diameter of the upper end 37 of the drive sleeve 21 and rotates the pinion 13 and driven pinion 15.

Rotation of the single control handle 41 in the opposite or counter-clockwise direction to the dotted line position b, causes the lower cam 30 to be depressed. In this position, the dwell on the lower face 34 of the cam 30 is engaged by the lowermost pin 32 and the intermediate pin 32 is positioned directly below but spaced from the dwell in the lower cam face 34 of the upper cam 29. As the upper coil spring 39 is thus free to expand, it moves the upper cam 29 downwardly and forces the shifter sleeve 26 downwardly until the pick-up or drive lug 24 engages the end 27 of the drive spring 20. This engagement causes the spring 20 to unwind or expand and clutch the inside diameter of the lower end 38 of the drive sleeve 21 and rotate the pinion 14 and driven pinion 15 in the direction opposite to that outlined above.

When the single control handle and its shifter shaft 28 are rotated through approximately 180° from neutral to the position shown at c, the cams 29 and 30 and the shifter sleeve 26 are again in neutral position but the wringer is unlocked from its indexed position. This indexing mechanism is fully disclosed in my prior Patent No. 2,377,819, of June 5, 1945, and reference is made thereto for a more complete disclosure of its construction and operation.

In Fig. 6, the driven member or pinion 13 is shown as provided with a tapered recess or counterbore 42 rather than the straight or cylindrical bore or recess shown in Figs. 3 and 4. In this alternate form, only the bottom portion of the spring 19 is engaged in frictional spring tension with the driven member and the adjacent portion of the spring is free. This tapered surface provides a relatively smooth surface between the adjacent inner surfaces of the recesses in the driven member or pinion 13 and the end 37 of the drive member or sleeve 21 and eliminates any shoulder therebetween. The pinion 14 is provided with a similar counterbore or recess for receiving the lower spring 20.

The tapered axial recess 42 provided in each gear 13 and 14 and opening toward the axial recess or cylindrical bore in the adjacent ends 37 and 38 of the drive collar or sleeve 21, provides a clutch pocket for the coiled clutch springs 19 and 20 between each gear and the drive collar or sleeve. These clutch springs are unsupported on their inner diameter and each is located in its respective clutch pocket with an end of each spring disposed in the reduced end of its tapered recess and thereat frictionally engaged to its respective gear, the remainder of each clutch spring being normally free from engagement with the remainder of the surface defining the tapered recess and the surface defining the axial recess in the drive collar or sleeve 21.

In this form of the invention, the drive lug 24 when engaging the free end of the clutch spring 19 or 20, causes the spring to expand into driving engagement with the free tapered surface on the driven member 13 or 14, as well as with the inner surface on the projecting end 37 or 38 on the drive sleeve.

As the clutch springs shown in the novel reversing drive are wholly unsupported on their inside diameter they require finishing on their outside diameter only and this may be accomplished in their free position. This lends itself to the high production of centerless grinding which is a simple and inexpensive operation. Furthermore, it is unnecessary to hold the thickness of the wire of which the springs are formed any closer than the ordinary wound tolerances.

Having thus disclosed my invention, I claim:

1. In a spring clutch drive, a drive shaft, opposed bevel gears journalled on the shaft but adapted to be clutched thereto, a drive collar secured to the drive shaft intermediate the opposed gears, said drive collar having an axial recess in each of its opposite ends, a tapered axial recess provided in each of the gears and opening toward the axial recess in the adjacent ends of the drive collar to thereby provide a clutch pocket between each gear and the drive collar, a coiled clutch spring unsupported on its inner diameter and located in each clutch pocket with an end of each clutch spring located in the reduced end of the tapered recess and thereat frictionally engaged to its respective gear, the remainder of each clutch spring being normally free from engagement with the tapered surface defining such recess and the surface defining the axial recess in the drive collar, a lug shiftably mounted in the drive collar, a shifter sleeve surrounding the drive collar and carrying the lug for moving an end of the lug into and out of engagement with the free end of either clutch spring and thereby expand or release the clutch spring from clutching engagement with the drive collar and one of the driven gears, a pair of cam members disposed adjacent to and each having a part engaging the shifter sleeve, and a pair of opposed spring members encompassing the drive collar and associated with the cam members for moving the shifter sleeve and its lug whereby the latter is moved into engagement with the free end of one of the clutch springs by one of the spring members when the other spring member is displaced by one of the cam members.

2. In a spring clutch drive, a drive shaft, opposed gears journalled on the shaft but adapted to be clutched thereto, a drive collar secured to the drive shaft intermediate the opposed gears, said drive collar having an axial recess in each of its opposite ends, a tapered axial recess provided in each of the gears and opening toward the axial recess in the adjacent ends of the drive collar to thereby provide a clutch pocket between each gear and the drive collar, a coiled clutch spring unsupported on its inner diameter and located in each clutch pocket with an end of each clutch spring located in the reduced end of the tapered recess and thereat frictionally engaged to its respective gear, the remainder of each clutch spring being normally free from engagement with the tapered surface defining such recess and the surface defining the axial recess in the drive collar, a lug shiftably mounted in the drive collar, a shifter sleeve surrounding the drive collar and carrying the lug for moving an end of the lug into and out of engagement with the free end of either clutch spring and thereby expand or release the clutch spring from clutching engagement with the drive collar and one of the driven gears, and means for moving the shifter sleeve and its lug whereby the latter is moved into engagement with the free end of one of the clutch springs.

THOMAS R. SMITH.

REFERENCES CITED

The following references are of record in the file of this patent:

UNITED STATES PATENTS

| Number | Name | Date |
| --- | --- | --- |
| 1,641,419 | Elsey | Sept. 6, 1927 |
| 1,749,066 | Burton | Mar. 4, 1930 |
| 1,819,306 | Starkey et al. | Aug. 18, 1931 |